(12) United States Patent
Iizuka

(10) Patent No.: US 8,384,803 B2
(45) Date of Patent: Feb. 26, 2013

(54) CAMERA SYSTEM AND METHOD FOR AMALGAMATING IMAGES TO CREATE AN OMNI-FOCUSED IMAGE

(76) Inventor: Keigo Iizuka, Don Mills (CA)

( * ) Notice: Subject to any disclaimer, the term of this patent is extended or adjusted under 35 U.S.C. 154(b) by 354 days.

(21) Appl. No.: 12/747,626

(22) PCT Filed: Dec. 13, 2007

(86) PCT No.: PCT/CA2007/002340
§ 371 (c)(1),
(2), (4) Date: Jun. 11, 2010

(87) PCT Pub. No.: WO2009/073950
PCT Pub. Date: Jun. 18, 2009

(65) Prior Publication Data
US 2010/0265346 A1 Oct. 21, 2010

(51) Int. Cl.
*H04N 5/262* (2006.01)
*H04N 5/232* (2006.01)
*G03B 13/00* (2006.01)
(52) U.S. Cl. .................... 348/239; 348/350
(58) Field of Classification Search .............. 348/222.1, 348/239, 262, 345, 349, 350
See application file for complete search history.

(56) References Cited

U.S. PATENT DOCUMENTS

| | | | |
|---|---|---|---|
| 4,965,840 A * | 10/1990 | Subbarao | 382/106 |
| 5,526,050 A | 6/1996 | King | |
| 6,240,209 B1 | 5/2001 | Wilcke | |
| 6,523,956 B2 | 2/2003 | Oshima | |
| 7,616,885 B2 * | 11/2009 | Chen et al. | 396/324 |
| 7,663,689 B2 * | 2/2010 | Marks | 348/370 |
| 7,683,962 B2 * | 3/2010 | Border et al. | 348/348 |
| 2001/0002216 A1 * | 5/2001 | Chuang et al. | 382/255 |
| 2003/0052991 A1 * | 3/2003 | Stavely et al. | 348/370 |
| 2006/0014228 A1 | 1/2006 | Simpson | |
| 2006/0045505 A1 | 3/2006 | Zeineh | |
| 2008/0231835 A1 * | 9/2008 | Iizuka | 356/72 |
| 2010/0309292 A1 * | 12/2010 | Ho et al. | 348/47 |

OTHER PUBLICATIONS

Iizuka, K. Divergence-Ratio Axi-Vision Camera (Divcam) a distance mapping camera . . . , filed Mar. 23, 2007.
Ren NG. Light Field Photography with a hand-held Plenoptic Camera, 2005.
Andres, Castano, Omnifocused 3D Display Using the Nonfrontal Imaging Camera, Jul. 20, 2009.
G.Hausler, A method to increase the depth of focus by two step image processing, Sep. 1972.

* cited by examiner

*Primary Examiner* — Daniel M Pasiewicz

(57) ABSTRACT

This invention relates to a system and method for creating an omni-focused image. Specifically, this invention relates to a system and method for electronically amalgamating images using real-time distance information to create an omni-focused image. The system of the invention comprises one or more video cameras aimed at a scene each generating a video output focused at a different distance, a distance mapping camera providing distance information for one or more objects in the scene, and a pixel selection utility wherein the pixel selection utility uses the distance information to select pixels from the video outputs to be used to generate a video display. The system is then operable to focus and amalgamate the video outputs to produce one image with multiple focal points or an omni-focused image.

26 Claims, 4 Drawing Sheets

CAMERA SYSTEM AND METHOD FOR AMALGAMATING IMAGES TO CREATE AN OMNI-FOCUSED IMAGE

FIELD OF THE INVENTION

This invention relates to electronic imaging technology. Specifically, this invention relates to a system and method for electronically amalgamating images using real-time distance information to create an omni-focused image.

BACKGROUND OF THE INVENTION

The field of electronic imaging technology has been used extensively to capture images in a two dimensional form. However, this technology has been greatly restricted because of its limited ability of producing an image which is focused to only one point in the target scene. The prior art describe technologies wherein images that are produced tend to lack depth resulting in segments of the image being in focus while other segments are out of focus, producing an inconsistent or blurry image. Innovations in this field have focused on image resolution and omni-directional image capturing methods in order to produce congruent images.

One such innovation in this field is described in the article *Light Field Photography with a Hand-held Plenoptic Camera* by Ren Ng et al. The article discloses a phenoptic camera that samples the 4D light field on its sensor in a single photographic exposure. This ability is achieved by inserting a microlens array between the sensor and main lens. Each microlens measures not just the total amount of light deposited at that location, but how much light arrives along each ray. By being able to resort the measured rays of light to where they would have terminated in slightly different, synthetic cameras, sharp photographs focused at different depths can be computed. The system described in this article allows for the measure of depth of an object and allows for computing synthetic photographs from different view points; however, the system does not allow for congruent image production wherein objects at different distances are all in focus within one image. Further, the resolution of the image taken by such a camera is limited by the diameter of the microlenses used.

What is needed, therefore, is a system and method for enabling congruent image production wherein objects at different distances are in focus in a single image.

SUMMARY OF THE INVENTION

The present invention teaches an image system comprising one or more video cameras aimed at a scene each generating a video output focused at different distance; a distance mapping camera wherein the distance mapping camera provides distance information corresponding to objects in a scene; and a pixel selection utility wherein the pixel selection utility uses the distance information from the distance mapping camera to select individual pixels from the video outputs to be used to generate a single video display; wherein the system is operable to focus and amalgamate the video outputs to produce one image with multiple focal points.

A further aspect of the present invention teaches an imaging method operable to amalgamate one or more video outputs aimed at a scene and focused at one or more distances to produce one image with multiple focal points comprising the steps of providing one or more video cameras, each video camera aimed at a scene and focused at a distance, each video camera operable to generate a video output; further providing a distance mapping camera also aimed at the scene wherein the distance mapping camera provides distance information corresponding to objects in the scene; and associating the one or more video cameras and the distance mapping camera with a pixel selection utility operable to use the distance information from the distance mapping camera to select individual pixels from the video outputs to be used to generate a single video display.

DETAILED DESCRIPTION

The proposed omni-focused or multi-focused camera (collectively referred to as "omni-focused camera") mitigates the depth of focus limitations of traditional single-focused cameras. An omni-focused camera refers to a camera that may be operable to generate an image focused on one or more points of objects in the image.

The omni-focused camera of the present invention electronically combines at least two images of the same scene focused at different distances, taken by means of at least two cameras (one or more video cameras and one distance mapping camera device). In the single video camera implementation of the present invention, the single camera is operable with a scanned focus utility further possessing a memory bank to store the multiple captured images.

In another implementation of the present invention, three or more cameras may be used (one distance mapping camera and multiple video cameras), in which case the present invention may be operable to amalgamate simultaneous images in a much more rapid rate as compared to the single camera with a scanned focus embodiment. Using additional video cameras is useful where objects within the images are moving as opposed to stationary scenery images. Both of these implementations will be further expounded upon.

Multiple Video Cameras Focused at Differing Distances

Figure 1:
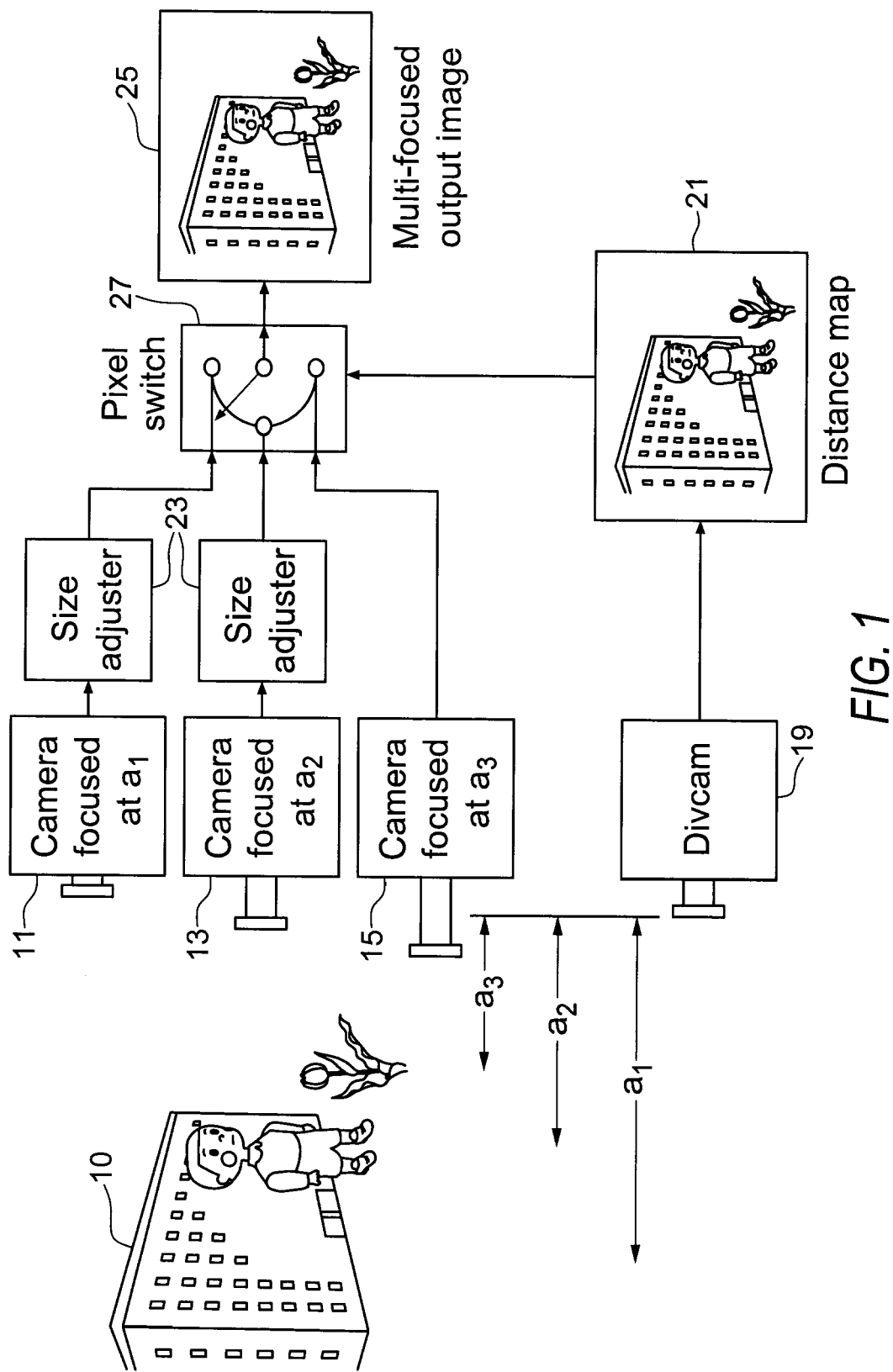
FIG. 1 illustrates the overall system for generating an omni-focused image.
Figure 2:
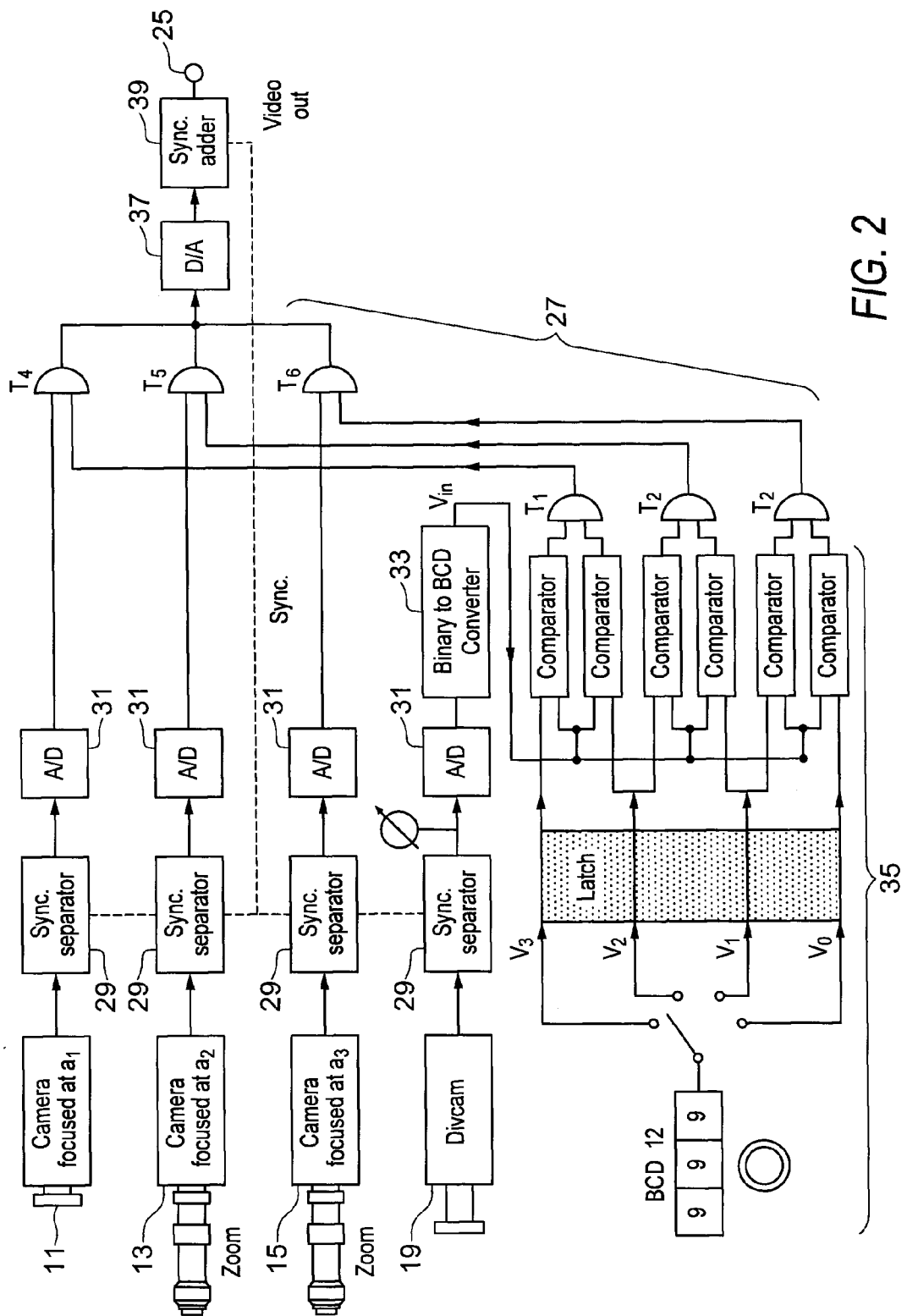
FIG. 2 illustrates an electronic block diagram of the system for generating an omni-focused image.

As previously mentioned the system, in one aspect of the invention, may utilize two or more cameras, one of which may be a distance mapping camera device and one or more of which may be a video camera. FIGS. 1-3 relate to implementations of the present invention incorporating more than one video camera focused at differing distances in addition to a distance mapping camera device.

FIG. 1 illustrates a representative embodiment of the overall system for generating an omni-focused image that utilizes four cameras including three video cameras (11, 13, 15) focused at distances a1, a2, a3. The three video cameras (11, 13, 15) are all aimed at the same image or scene (17). In addition the fourth camera is a known distance mapping technology such as the Divergence Ratio Axi-vision Camera (Divcam™):Distance Mapping Camera described in U.S. patent application Ser. No. 11/690,503 (19) or the NHK Axi-Vision Camera™, which is incorporated into the system to provide distance information and to generate a distance map (21). As further illustrated, at least two of the video cameras (13, 15) may be required to send their video output through a size adjuster (23). The size adjuster (23) is a known technology that ensures that the video output of each video camera (11, 13, 15) is congruent thereby ensuring the integrity of the final amalgamated omni-focused image (25).

In order to generate the final amalgamated omni-focused image (25), the video output of the three video cameras (11, 13, 15) may be selectively passed through a device known as a pixel switch (27). The pixel switch (27) makes use of the generated distance map (21) to select the video output of the three video cameras (11, 13, 15) on a pixel by pixel basis. Based upon a latched distance range (see FIG. 2 description) and the generated distance map (21), the pixel switch (27) may determine which pixel from the video output of which of the three video cameras (11, 13, 15) is to be incorporated into the final amalgamated omni-focused image (25).

It should be further noted that while the system described in FIG. 1 and FIG. 2 describes a three video camera embodiment, the system is scaleable to incorporate additional video cameras by for example including for each additional video camera corresponding comparator pairs of circuitry. The present invention, in one particular aspect thereof, may therefore be embodied by as few as 2 video cameras and as many as N video cameras.

FIG. 2 illustrates a more detailed electronic block diagram of the omni-focused image generation system. Of special note in this diagram is the inclusion of devices known as sync separators (29) operable to remove the sync signal from the video output of the video cameras (11, 13, 15). In video camera systems, successive switching actions between pixels may be tightly controlled by both the vertical and horizontal sync signals. These signals can either be generated internally in the camera or in more elaborate camera systems the switching action may be dictated by externally generated sync signals. The externally generated signals may be fed into all of the cameras of the system thereby ensuring that the cameras are properly synchronized. In one embodiment of the present invention, the video cameras (11, 13, 15) make use of an externally generated sync signal.

In addition, the sync stripped video output may then be processed by a device known as an analog to digital device (31). The analog to digital device (31) converts the analog video output of the video cameras (11, 13, 15) into a digital stream which is a form that is more readily comparable by the latch mechanism (35) and the pixel switch (27). It should also be noted that the distance mapping camera device (19) may also be subject to synchronization and analog to digital treatment as conducted on the output of the video cameras (11, 13, 15). Once the output of the distance mapping camera device (19) has been converted to a binary or digital form, it may then converted to binary converted decimal (BCD) using a binary to BCD converter (33) or other suitable utility.

The output Vin from the BCD converter is then used to form the pixel by pixel comparison by the latch mechanism (35) and the pixel switch (27). As illustrated by FIG. 2, the pixel comparison may be implemented by using a known latching mechanism (35) to latch a series of voltages ($V_0$ to $V_3$). The latched voltages correspond to a series of distance ranges i.e. $V_3$ to $V_2$, $V_2$ to $V_1$, and $V_1$ to $V_0$. The distance ranges correspond to the focus distances a1, a2, a3 of the video cameras (11, 13, 15). With the aid of a device known as a comparator (36), the BCD output Vin may then compared to the latched voltages ($V_0$ to $V_3$). The output from the latching mechanism (35) is then used by pixel switch (27). As illustrated in FIG. 2, the pixel switch (27) may be embodied by a series of AND gates ($T_1$-$T_6$). The AND gates selectively determine which video stream a1, a2, a3 will be incorporated into the multi-focused output image (25) on a pixel by pixel basis based upon the latch output from the latching mechanism (35). It should be further noted that a hardware device such as a frame grabber or other programmable device may implement the following functions: pixel switch (27), the latching mechanism (35) and synchronization of the system (29).

However from a costs perspective, the latching mechanism (35) may be more effectively implemented through the use of an integrated circuit (IC).

For example considering a particular pixel belonging to the a2 distance and whose output Vin obeys the following relationship the $V_2$<Vin<$V_1$. In that scenario, only the output of the AND gate $T_2$ would generate a positive or "1" output. More specifically, the output of the AND gates $T_1$ and $T_3$ would both be "0" which in turn would shut off both of the $T_4$ and $T_6$ AND gates. Moving along the circuit block, one can see, that AND gate $T_5$ would be the only gate that would pass a signal therefore, the pixel information taken from the camera focused at a2 would be the camera whose information would contribute to the final multi-focused output image (25).

As previously stated in FIG. 1, the pixel switch (27) or the latch system (35) described in FIG. 2 compares the video output of the video cameras (11, 13, 15) along with the video output of the distance mapping camera device (19) on a pixel by pixel basis. If a pixel has been selected to be incorporated into the final amalgamated omni-focused image (25), it may then be reconverted to analog using a digital to analog converter (37) and the synchronization header is then reapplied using a sync adder tool (39).

Figure 3A:
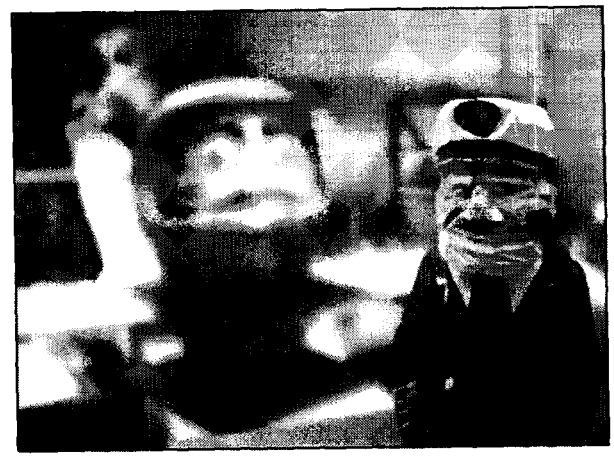
FIG. 3*a* illustrates an image that has been focused to a close object.
Figure 3B:
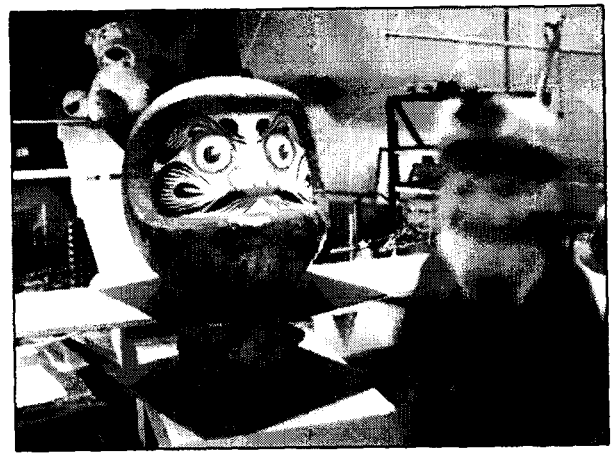
FIG. 3*b* illustrates an image that has been focused to a far object.
Figure 3C:
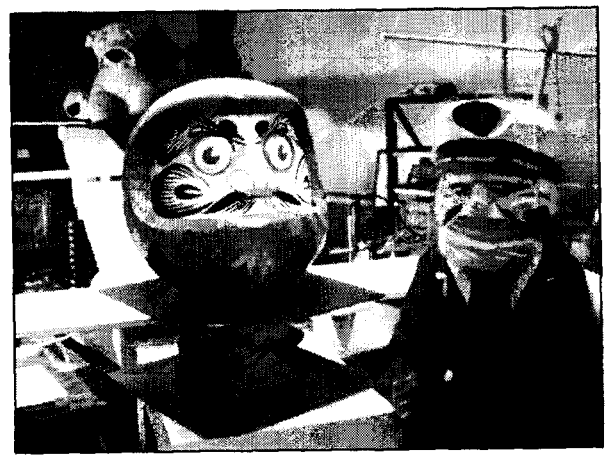
FIG. 3*c* illustrates an omni-focused image.

FIG. 3a shows an image that has been focused to a close object. FIG. 3b shows the same image focused to a far object. FIG. 3c evidences an amalgamation of the two focal points to generate an omni-focused image.

Single Video Camera With a Scanned Focus

Figure 4:
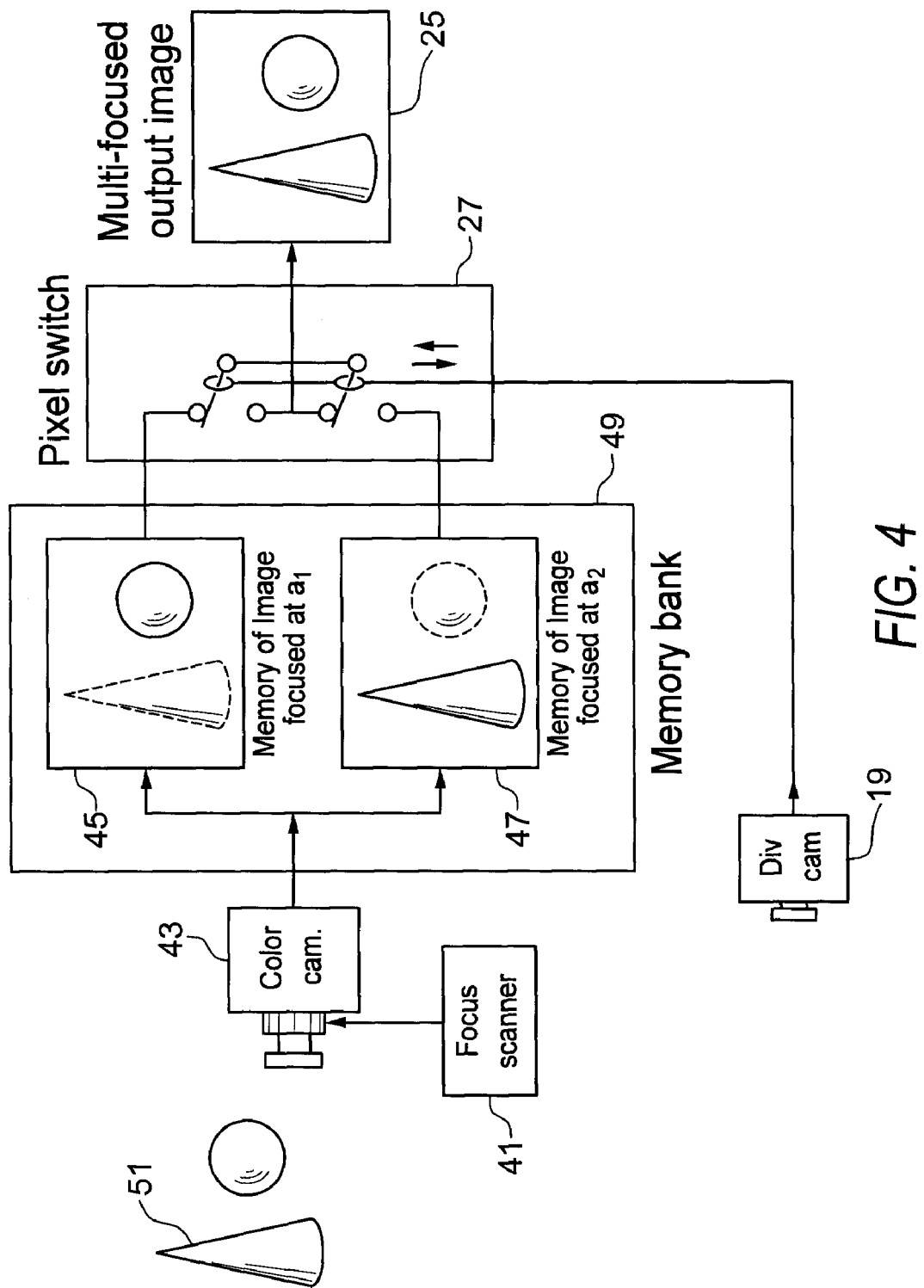
FIG. 4 illustrates an embodiment of the present invention using one video camera and one distance mapping camera.

As depicted in FIG. 4 the present invention may be implemented using two cameras focused at a relatively stationary scene (51). In this embodiment, two cameras may be utilized, a single video camera (43) and a distance mapping camera device (19). Further, the video camera (43) may be operable to have its focus scanned using a focus scanning utility (41), such that a plurality of images, each focused on a different object in the image, is produced (45, 47). The plurality of images (45, 47) may then be stored in a memory bank (49). The selection of the proper pixel is performed using the distance information from the distance mapping camera device (19) but the image sources may be the plurality of images (45, 47) stored in the memory bank (49) from the single video camera (43) rather than a plurality of images taken concurrently in the previously described implementation using several video cameras. Similar to the multiple video cameras implementation, a multi-focused output image (25) of the target scene (51) may be the end result.

In a particular aspect of the present invention, the system for amalgamating simultaneous images to create an omni-focused image could be readily adopted into the television and movie industry. Having the ability to always generate a focused scene with one system as opposed to requiring numerous costly devices with specific focal points could generate economical savings in addition to the time savings due to a lessened need for editing. This ability to generate a multi-focused image may be especially useful when the target object is in motion and the cameraman can not predict the motion of the target object.

In another embodiment of the present invention, the invention may be incorporated into an endoscope or a laparoscope for medical purposes wherein the real-time imaging provides important information.

In another aspect of the present invention, the system for amalgamating simultaneous images to create an omni-focused image could be readily incorporated into the market for the non-professionals for personal use. The system can be automated to further enhance ease of use which could be adopted by the home consumer.

The invention claimed is:

1. An image system comprising:
   (a) one or more video cameras aimed at a scene each generating a video output focused at a different distance;
   (b) a distance mapping camera providing distance information for one or more objects in the scene; and
   (c) a pixel selection utility wherein the pixel selection utility uses the distance information to select pixels from the video outputs to be used to generate a video display; wherein the system is operable to focus and amalgamate the video outputs to produce one image with multiple focal points.

2. The system as claimed in claim 1 wherein the video output, the distance information, and the video display are substantially synchronized.

3. The system as claimed in claim 2 wherein the video output and the distance information are synchronized by means of a general sync signal and the single video display is synchronized by means of a sync adder.

4. The system as claimed in claim 2 wherein the size of the video output is adjustable by means of a size adjuster.

5. The system as claimed in claim 1 wherein the distance mapping camera is a Divergence Ratio Axi-vision Camera.

6. The system as claimed in claim 3 wherein, the distance information converted into binary coded decimal.

7. The system as claimed in claim 6 wherein the pixel switch may be further implemented by means of a latching mechanism and a series of AND gates.

8. The system as claimed in claim 7 wherein the latching mechanism may be further comprised of at least two comparator pairs.

9. The system as claimed in claim 8 wherein the comparator pairs of the latching mechanism compare the binary coded decimal distance information to latched predetermined threshold voltages to generate a latch output.

10. The system as claimed in claim 9 wherein the latch output is used by the series of AND gates to select individual pixels from the video output to generate the video display.

11. The system as claimed in claim 7 wherein the latching mechanism is implemented by means of latching in an integrated circuit.

12. The system as claimed in claim 1 wherein 2 to N video cameras may be incorporated into the system focused at up to N−1 different distances.

13. The system as claimed in claim 1 wherein only one video camera is provided, the video camera being operable to produce a plurality of video outputs each focused at different distances and store the video outputs to a memory means linked to the system, wherein the video display is generated from the video outputs stored to the memory means.

14. The system as claimed in claim 1 wherein the video cameras output video images simultaneously and the distance mapping camera provides the distance information in real time.

15. The system as claimed in claim 1 wherein the system provides an endoscope.

16. The system as claimed in claim 1 wherein the system provides a laparoscope.

17. The system as claimed in claim 12 wherein the system provides a means to produce a single set of frames corresponding to a moving image focused at multiple points.

18. A method for amalgamating one or more video outputs aimed at a scene and focused at one or more distances to produce one image with multiple focal points comprising the steps of:
   (a) providing one or more video cameras, each video camera aimed at a scene and focused at a distance, each video camera operable to generate a video output;
   (b) further providing a distance mapping camera also aimed at the scene wherein the distance mapping camera provides distance information corresponding to one or more objects in the scene; and
   (c) generating a video display by selecting pixels from the video outputs using the distance information linking the one or more video cameras and the distance mapping camera with a pixel selection utility operable to use the distance information from the distance mapping camera to select individual pixels from the video outputs to be used to generate a single video display.

19. The method as claimed in claim 18 wherein the video cameras output video images simultaneously and the distance mapping camera provides the distance information in real time.

20. The method as claimed in claim 19 wherein at least two video cameras are provided to generate the video outputs.

21. The method as claimed in claim 18 comprising the further steep of adjusting the size of the video outputs to ensure that the video outputs are congruent.

22. The method as claimed in claim 18 wherein the pixel selection utility is a pixel switch operable to select, one pixel at a time, the particular video output associated with the distance information of the object corresponding to the pixel.

23. The method as claimed in claim 18 comprising the further step of synchronizing the video output, the distance information, and the video display.

24. The method as claimed in claim 23 wherein the synchronization is enabled externally to the cameras.

25. The method as claimed in claim 23 wherein the synchronization is provided by means of sync separator means is generated by one or more of the cameras.

26. The method as claimed in claim 18 wherein the pixel utility is associated with the one or more video cameras and the distance mapping camera, the method further comprising the steps of:
   (a) associating an analog output of each video camera with an input of an analog to digital conversion means; and associating an output of the analog to digital conversion means with an input of the pixel utility.

* * * * *